United States Patent [19]

Vershbow

[11] 3,993,373
[45] Nov. 23, 1976

[54] DISPENSER WITH SUSPENDED CARRIER

[75] Inventor: Daniel R. Vershbow, Newton, Mass.

[73] Assignee: Serv-O-Lift Corporation, Dorchester, Mass.

[22] Filed: Sept. 24, 1975

[21] Appl. No.: 616,286

[52] U.S. Cl. .................................. 312/71; 211/49 D
[51] Int. Cl.² ........................ A47F 1/00; B65G 1/16
[58] Field of Search .................... 108/136, 145, 147; 211/49 D; 221/226, 227, 232, 279; 312/71, 272, 306

[56] References Cited
UNITED STATES PATENTS

| 2,919,168 | 12/1959 | Shivek | 312/71 |
| 3,722,970 | 3/1973 | Healy | 312/71 |
| 3,820,478 | 6/1974 | Bergenthal | 312/71 |
| 3,863,576 | 2/1975 | Olsson | 312/71 |

*Primary Examiner*—Casmir A. Nunberg
*Attorney, Agent, or Firm*—Kenway & Jenney

[57] ABSTRACT

Disclosed is a dispenser of the type having a suspended, upwardly biased, carrier plate for holding trays, plates, etc. and for automatically advancing the load of articles to present the uppermost article at a predetermined position near the open top of the dispenser. The dispenser has an improved biasing system for achieving the automatic advancement of the load employing compression or tension springs as the biasing means and a deformer supported for vertical movement with the carrier plate and for horizontal movement relative to the carrier plate so that it can bear upon the biasing means to cause deformation thereof. A cam member is obliquely supported on the frame within which the carrier moves and horizontally deflects the deformer as the carrier tray is depressed. Thus, the further the carrier plate is depressed (e.g., by the addition of items to the stack which the carrier plate supports) the greater will be the deformation of the biasing means and the greater the biasing force acting against the deformer and cam member to urge the carrier plate upwardly. The cam member can be adjusted in its angle with respect to the vertical to vary the amount of deformation of the biasing means at any given vertical position of the carrier plate, thereby permitting the adjustment of the biasing force so that the dispenser can be used to dispense articles of different weights with the appropriate balance of the weight of the stack of articles and the upward biasing force.

10 Claims, 2 Drawing Figures

DISPENSER WITH SUSPENDED CARRIER

BACKGROUND OF THE INVENTION

This invention relates to dispensers of the type which store a varying sized load of trays, plates, or other articles and which automatically advance the load to present the uppermost article of the load at a predetermined position for convenient removal.

The general design and operation of such dispensers are explained in U.S. Pat. No. 2,919,168 entitled "Dispenser with Suspended Carrier" which is owned by the assignee of the present invention. The present invention concerns a dispenser having a carrier plate and a suspension system as described in U.S. Pat. No. 2,919,168, but has as an object the provision of an improved elevating or biasing mechanism.

SUMMARY OF THE INVENTION

Briefly, the invention features improvements in a dispenser having an open topped frame, a carrier plate movable within the frame and supported by a suspension system which maintains the carrier plate level at all positions thereof in the frame, and a biasing system for biasing the carrier plate toward the open top. In the improved dispenser, the biasing system comprises a resilient biasing member which produces a biasing force that increases with increasing deformation from a base configuration, a deformer supported on the carrier plate for vertical movement with the carrier plate and for horizontal movement relative to the carrier plate, and a cam member supported on the frame and disposed to drive the deformer horizontally, causing deformation of the biasing member, as the carrier plate moves downwardly under the influence of a load placed thereon.

As noted above, the biasing members utilized may be either tension or compression springs, but in preferred embodiments of the invention a plurality of compression springs are mounted for vertical movement with the carrier plate and each is supported on a hollow, slotted, mandrel secured to the carrier plate. With such compression springs the deformer comprises a rod passing through the slots of the mandrels for sliding motion with respect to the mandrels so as to compress the springs and having rollers supported at projecting ends of the rod for engagement with cam members. Two such cam members are provided, one for each of the rollers, each cam member adjustably supported on the frame for altering the angle which the cam member makes with the vertical, thereby altering the amount of compression of each spring and thus the amount of elevating force, at any given vertical position of the carrier plate. When tension springs are used, the mandrels may be eliminated.

These and other features of the invention will become apparent from the following description of a particular preferred embodiment thereof selected for the purposes of illustrating the invention and shown in the accompanying drawings.

DETAILED DESCRIPTION OF A PARTICULAR PREFERRED EMBODIMENT

Figure 1:
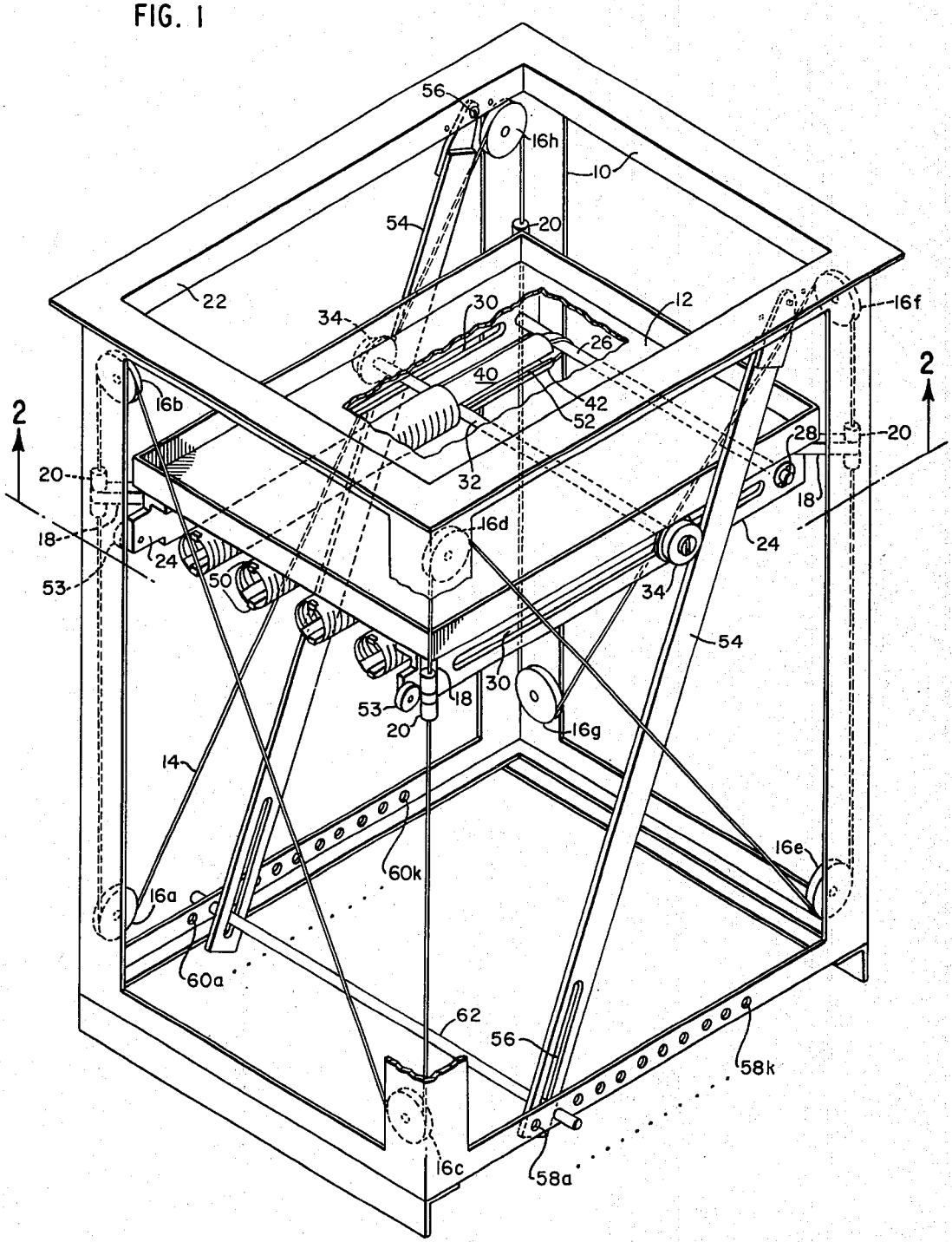
FIG. 1 is a partially broken-away, perspective view of a dispenser constructed in accordance with the present invention.

Referring to FIG. 1, the dispenser includes a frame 10 which supports the remaining elements of the dispenser. Typically, the frame 10 would be provided with side panels (not shown), or would be otherwise enclosed, and could also be provided with wheels to facilitate movement of the dispenser from place to place (e.g., from a dish washing location to a dish dispensing location).

A carrier plate 12 is disposed in a horizontal orientation for vertical movement within the frame 10. A suspension system for the carrier plate comprises an endless cord or cable 14 trained over a system of pulleys 16a–16h, each of which is secured to the frame 10. Brackets 18 extend from the corners of the carrier plate 12 and support clamps 20 which are secured to vertically extending runs of the cable 14 at the four corners of the frame 10. As explained in the previously mentioned U.S. Pat. No. 2,919,168, this suspension system maintains the carrier plate 12 level at all vertical positions thereof, and regardless of the load supported thereon. The clamps 20 and the upper pulleys 16b, 16d, 16f, and 16h cooperate to define stops limiting the vertical motion of the carrier plate 12 adjacent the open top 22 of the frame 10.

Figure 2:
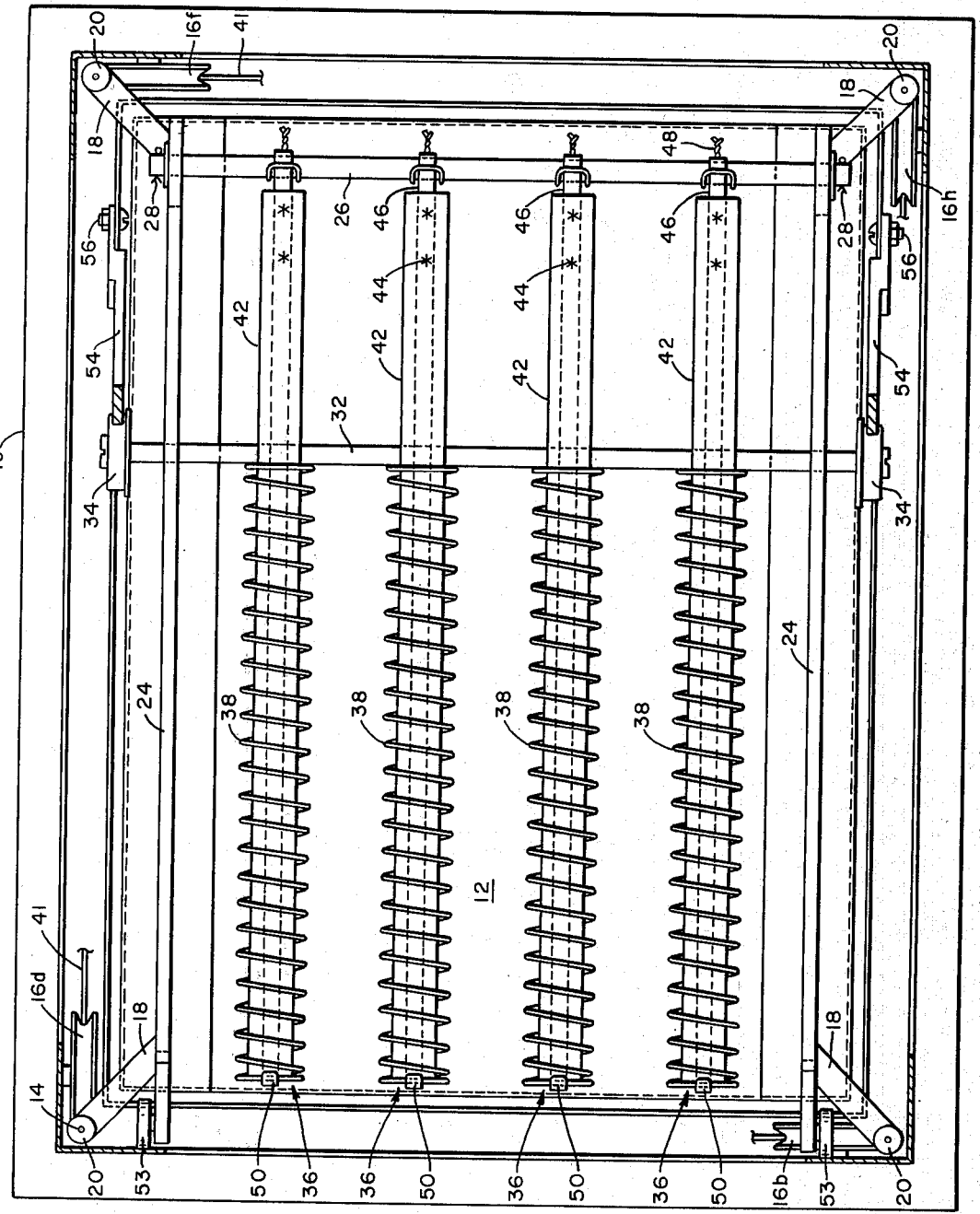
FIG. 2 is a view taken at 2—2 of FIG. 1

Referring to FIGS. 1 and 2, the carrier plate 12 has a pair of flanges 24 secured to the lower surface thereof and extending along the length of the carrier plate at two parallel edges thereof. A rod 26, secured by cotter pins 28, extends between the flanges 24, passing through openings provided in the flanges adjacent one end of each. Each flange 24 is also provided with a horizontally extending guide slot 30. A rod 32 extends between the flanges 24, passing through the slot 30 of each and having a roller 34 secured at each end thereof. The rollers 34, in addition to other functions discussed below, prevent movement of the rod 32 in a direction parallel to its axis, thereby maintaining the rod in guide slots 30.

A plurality of biasing members 36 are provided intermediate the flanges 24, each biasing member having an axis parallel to the flanges 24. In the preferred embodiment illustrated, each biasing member 36 comprises a compression spring 38 disposed about a mandrel consisting of upper and lower semicylindrical members 40, 42 which are secured, as by spot welds 44, to an interior member 46. The member 46 is wrapped around the rod 26, and secured thereto with a tie member 48, at one end of the carrier plate 12 and has upper and lower hooked tips 50 which engage the compression spring 38 at the other end of the carrier plate 12. The upper and lower semicylindrical members 40 and 42 are maintained with a separation, thereby defining horizontally extending slots 52 (see FIG. 1) through each of the biasing members 36. Rollers 53 are pivotally secured to extensions of flanges 24 and engage vertical surfaces of the frame 10.

The rod 32 passes through each of the slots 52 of each of the biasing members 36. Each of the rollers 34, secured to the rod 32, engages a cam member 54 which is in turn secured, as at 56, to the frame member 10 at its upper end and which is disposed at an acute angle to the vertical. The lower end of each cam member 54 is arranged to be secured to any of a plurality of locations on a lower portion of the frame 10, thereby providing for a plurality of angles with respect to the vertical at which the member 54 can be maintained. In the illustrated embodiment, each member 54 is provided with a slot 56 near its lower end. Adjacent lower parallel portions of the frame 10 are provided with two aligned series of holes 58a–58k and 60a–60k, pairs of holes bearing the same letter suffix being in registration with each other. A rod 62 passes through a pair of holes (e.g., holes 58b and 60b) and through the slots 56 of the cam members 54, thereby maintaining each of the cam members 54 at a predetermined acute angle with respect to the vertical. Whatever the chosen angle of the cam member 54, the force of springs 38 urges the rollers 34 into contact with the cam members 54.

Alternatively, the rod 62 could be connected to the frame 10 by means of a rotatable threaded member which, upon rotation would move the rod horizontally permitting infinitely variable adjustment of the cam members 54.

In operation, the force of the springs 38 against the rod 32 causes the rollers 34 to ride up the cam member 54 thereby biasing the carrier plate 12 to an uppermost position defined by the point of contact of the clamps 20 with the upper pulleys of the suspension system. As a load is placed on the carrier plate 12, the weight of the load will force the carrier plate downwardly. The downward motion of the carrier plate 12 will cause the rollers 34 and rod 32 to be horizontally deflected by the cam members 54, thereby acting as a deformer which deforms (i.e., compresses) the biasing springs 38. The rollers 53 prevent a horizontal shifting of the carrier plate itself. Since the biasing force exerted on the rod 32 by the springs 38 increases with their compression, the weight of the load placed upon the carrier plate 12 will be balanced by the restoring force exerted by the springs 38 at some predetermined compression of those springs (i.e., at some vertical postion of the carrier plate 12). With appropriately chosen springs, this position can be chosen such that the uppermost item in a load (e.g., a stack of trays, plates, or other such items) can be presented for dispensing at a convenient location (e.g., just above the open top 22 of the frame 10).

Furthermore, because the orientations of the cam members 54 can be adjusted, the amount of compression of the springs 38 at any given vertical position of the carrier plate 12, and thus the amount of restoring force at any given vertical position of the carrier plate 12, can be selected. It will thus be appreciated that a single dispenser can be employed for items of different weights, while maintaining the convenient position of dispensing of the uppermost item, by simply adjusting the angle of the cam members 54. For gross changes in the weight of items to be dispensed, the springs 38 can be replaced with others which are of suitable resistance.

Since the weight of a load placed on the carrier plate 12 will be strictly proportional to the height of the load (e.g., twice as many plates weigh exactly twice as much) while springs may exhibit a nonlinear restoring force, the surfaces of the cam members 54 which contact the rollers 34 can, if required, be appropriately curved to compensate for the nonlinearity in the springs' restoring force.

While a particular preferred embodiment of the invention has been illustrated in the accompanying drawings and described in detail herein, other embodiments are within the scope of the invention and the following claims.

I claim:

1. In a dispenser comprising a frame having an open top, a carrier plate movable in said frame and accessible through said open top, a suspension system for maintaining said carrier plate level at all positions thereof in said frame, and a biasing system for biasing said carrier plate toward said open top, the improvement wherein said biasing system comprises a resilient biasing member which produces a biasing force that increases with increasing deformation of said biasing member from a base configuration and which is supported on said carrier plate for vertical movement therewith, a deformer supported on said carrier plate for vertical movement with said carrier plate and for horizontal movement relative to said carrier plate and said biasing member, and a cam member supported on said frame and disposed to drive said deformer horizontally as said carrier plate moves downward thereby causing deformation of said biasing member.

2. The dispenser of claim 1 wherein said deformer comprises a rod supported for horizontal movement in aligned slots provided in members secured to opposite sides of said carrier plate, and wherein there are a pair of said cam members in registration with each other and supported on sides of said frame adjacent said slots, said deformer further comprising a bearing member at each end of said rod for contact with each of said cam members.

3. The dispenser of claim 2 wherein said bearing members comprise rollers rotatably secured to opposite ends of said rod.

4. The dispenser of claim 2 wherein each said cam member comprises a rigid rod disposed at an acute angle with respect to the vertical and secured at its upper and lower ends to said frame.

5. The dispenser of claim 4 wherein, for each said cam member, one of the ends thereof and the adjacent portion of said frame include means for securing said one end to said frame at different locations on said frame, whereby the angle each said cam member makes with respect to the vertical may be altered, thereby altering the degree of deformation of said biasing member at any given position of said carrier plate within said frame.

6. The dispenser of claim 5 wherein there are a plurality of biasing members, each secured to said carrier plate.

7. The dispenser of claim 6 wherein each of said biasing members comprises a spring.

8. The dispenser of claim 6 wherein each biasing member comprises a compression spring supported on a hollow, longitudinally slotted mandrel, said deformer rod passing through the slots of each said mandrel substantially perpendicular to the axis of each said compression spring.

9. The dispenser of claim 1 wherein there are a plurality of said biasing members, each said biasing member comprising a spring supported on said carrier plate for vertical motion therewith and deformable in a horizontal direction.

10. The dispenser of claim 1 wherein said cam member comprises a rigid member disposed at an acute angle with respect to the vertical and secured to said frame at the upper and lower ends of said cam member, one end of said cam member pivotally secured to said frame and the other end of said cam member and the adjacent portion of said frame including structure allowing said other end of said cam member to be secured to said frame at a plurality of locations on said frame.

* * * * *